United States Patent

Wonn

[11] Patent Number: 6,142,269
[45] Date of Patent: Nov. 7, 2000

[54] ROTARY DAMPER

[75] Inventor: Marcus Wonn, Röttingen, Germany

[73] Assignee: ITW-ATECO GmbH, Rottingen, Germany

[21] Appl. No.: 09/212,299

[22] Filed: Dec. 16, 1998

[30] Foreign Application Priority Data

Dec. 16, 1997 [DE] Germany .............. 197 55 947

[51] Int. Cl.⁷ ...................................... F16D 57/00
[52] U.S. Cl. ...................... 188/290; 188/266.3
[58] Field of Search ............... 188/266.3, 290, 188/293, 130, 306, 307

[56] References Cited

U.S. PATENT DOCUMENTS

| 2,192,876 | 3/1940 | Willard | 188/268 |
| 4,768,630 | 9/1988 | Aubry et al. | 188/290 |
| 4,842,106 | 6/1989 | Ludwig et al. | 188/266 |

FOREIGN PATENT DOCUMENTS

| 2510692 | 2/1983 | France . |
| 31 23 344 | 6/1981 | Germany . |
| 3726-031 | 2/1988 | Germany . |
| 296 04 260 U | 3/1996 | Germany . |
| 9-96330 | 4/1997 | Japan . |
| 2 095 789 | 3/1982 | United Kingdom . |
| WO 88/09885 | 12/1988 | WIPO . |

*Primary Examiner*—Michael Mar
*Assistant Examiner*—Xuan Lan Nguyen
*Attorney, Agent, or Firm*—Schwartz & Weinrieb

[57] ABSTRACT

A rotary damper with a housing, with a rotor rotatably mounted in a closed chamber of the housing and with a viscous medium disposed within the chamber, wherein the rotor is so formed and so cooperates with the wall of the chamber that with a relative rotation of the housing and the rotor, a braking effect is produced by the medium, and wherein at least two rotor elements are provided which are arranged coaxially, preferably commonly in the chamber, and the neighboring rotor elements are coupled such that they are freely rotatable relative to one another over a limited rotational angle.

21 Claims, 1 Drawing Sheet

ROTARY DAMPER

FIELD OF THE INVENTION

The present invention relates to rotary dampers, and more particularly to a rotary damper which can produce different degrees of damping.

BACKGROUND OF THE INVENTION

Rotary dampers are known in the most varied of formations and fields of application. They are commonly provided upon automobiles in which certain parts, such as lids for glove compartments, ash trays, holding grips or like are damped in their movement. In most cases it is a case of preventing a heavy knocking of the parts against an abutment. By way of this knocking, specifically undesirable noises are produced and the lifetime of the function is compromised.

In many cases a damping is only desirable in one direction, so that the damper exhibits a free running in the opposite direction. However these are more complicated with respect to the simple rotary dampers and require more space, which commonly is not available for the installation.

A typical rotary damper comprises a housing, mostly of plastic, in which a chamber for the rotor is formed. The rotor is rotatably mounted in the housing and extends by means of shaft to one or both sides out of the housing. On one end of the shaft protruding out of a the housing, a pinion is seated which can be brought into engagement with a counter-pinion or a rack. Often the damper is stationarily applied so that an arcuate rack on the part to be damped rotates the pinion when the part is moved. In the chamber of the damper housing there is disposed a viscous medium which acts between the rotor and the chamber wall when the relative movement between the rotor and the housing takes place. For the formation of a rotor there are the most varied of embodiment forms. A typical formation consists in providing the rotor with at least one vane which radially projects into the chamber and may be observed as a type of rotating piston. With the movement of the vane in the chamber, medium is displaced which is forced through a gap between the vane and the chamber wall or which reaches the other side of the vane in another way. In this context it is also known to provide flexible vanes of a rotor for rotary dampers in order to form a differently large gap between the vane and the chamber wall, according to the rotational direction, in order to achieve an effect similar to free running in the one rotational direction.

All known rotary dampers have in common that on operation they produce a more or less constant braking moment. In some cases of application however the torque on the part to be damped is not constant but changes with the rotational position. If for example the flap of a glove compartment is opened, the flap is located approximately in the dead center position, that is exerts a very small torque in the opening direction. If the rotary damper has a relatively high braking moment the initial torque of the flap is not sufficient to set this flap in motion. If on the other hand the damper is given just a slight braking moment, then the opening speed at the end of the adjustment is too large.

OBJECT OF THE INVENTION

It is the object of the present invention to so improve a rotary damper of the prior art type that in the rotational direction differing braking moments are produced.

SUMMARY OF THE INVENTION

With the rotary damper according to the invention, at least two rotor elements are provided which are arranged coaxially, preferably commonly in a chamber. The rotor elements are so coupled to one another that they are rotatable against one another over a limited rotational angle.

It is to be understood that two or more rotor elements produce a higher braking moment than only one rotor element. If therefore at the beginning of an actuation of a part to be braked, only the one rotor element is made effective, firstly only a correspondingly low braking moment is produced, which then increases in a stepped manner if also the second rotor element is co-rotated. It is to be understood that in this manner a multitude of coaxial rotor elements may be coupled together.

It is conceivable to realize the invention in that two or more housings of rotary dampers are coaxially arranged with a rotor in each case, so that their shaft sections guided outwardly may be coupled to one another in the described way and manner. It is however less complicated and requires less constructional space when a common chamber is provided for the rotor elements and the rotor elements within the chamber are connected to one another by means of a special coupling.

If the rotor elements are arranged within the common chamber, according to one formation of the invention it is advantageous when the ends facing one another form a rotary bearing. This may be effected according to one embodiment of the invention in that a rotor element at one end comprises a central peg circular in cross section which approximately fits within a central, preferably cylindrical bore of the other rotor element. According to which location the coupling is mounted, the peg and bore are provided with a relatively large diameter approximating the outer diameter of the rotors.

For the coupling of neighboring rotor elements, preferably a type of claw coupling is provided, wherein however the claw sections are formed or mounted such that a relative rotation between the rotor elements is possible with which a force transmission of one rotor element onto the other does not take place. A particular formation of this invention provides for two coupling claws lying opposite one another to be provided in an end-side recess of one rotor element, and for the other rotor element with a plate-like coupling section to engage into the recess and selectively be able to be brought into engagement with a coupling surface of the coupling claws. This engagement is preferably in the manner such that the plate-like section completely engages with the coupling surfaces so that no high surface loadings occur.

The extent of the free rotation between the coupling elements is dependent on which braking behavior is desirable. If a small braking moment is required over a small rotational angle, then a free rotation may be correspondingly limited and vice-versa. In the extreme case, the maximum free rotation is approximately 360° when the one coupling section only extends to approximately the rotational axis and the other rotor element merely comprises an abutment. With such a formation the cooperating coupling sections are however designed relatively weak. Normally however such a large free rotational angle is not required.

BRIEF DESCRIPTION OF THE DRAWINGS

The invention is hereinafter described in more detail by way of one embodiment example when considered in connection with the accompanying drawings in which like reference characters designate like or corresponding parts throughout the several views, and wherein.

DETAILED DESCRIPTION OF THE INVENTION

Figure 1:
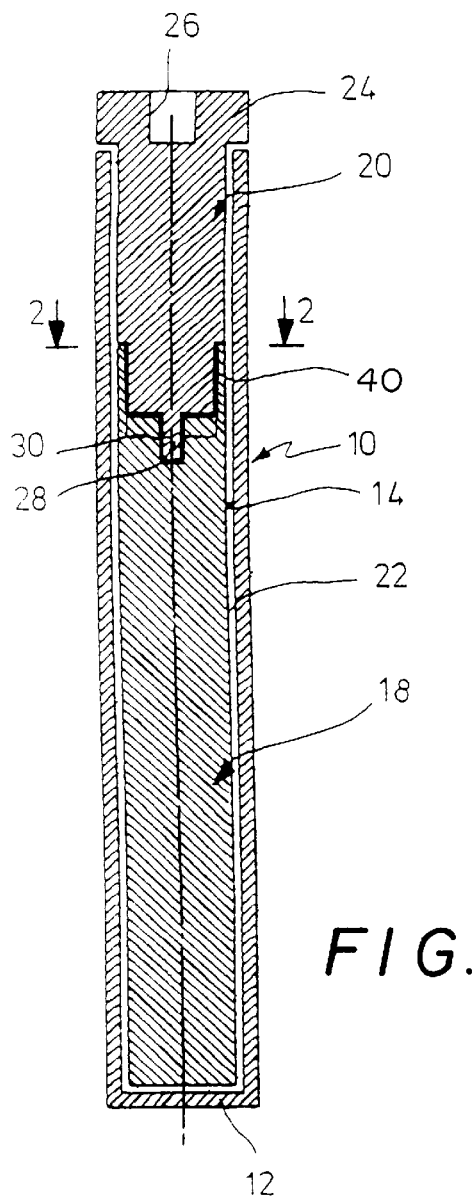
FIG. 1 is a cross section of a rotary damper according to the invention.
Figure 2:
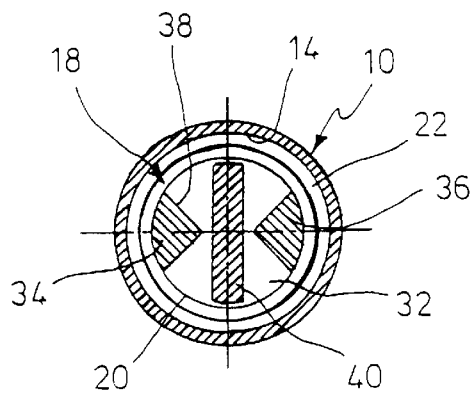
FIG. 2 is a section through the damper according to FIG. 1 along the line 2—2.

The rotary damper shown in the FIGS. 1 and 2 comprises a cylindrical housing 10 which is open at one end and at the other end is closed by a floor 12. The housing 10 forms a cylindrical inner space 14 or a chamber which accommodates two rotor elements 18, 20. In the case shown, the rotor elements 18, 20 are shown with a cylindrical outer surface. This, is however not of importance. Instead of this the rotor elements 18, 20 may comprise at least one radial vane or the like. Between the rotor elements 18, 20 and the wall of the chamber 14 there is formed an annular gap 22 which is filled with a viscous medium. The rotor element 20 comprises a cylindrical section 24 lying on the outside which may be formed as a pinion. Alternatively the section 24 may be formed with a rectangular deepening 26 for the purpose of engagement with a peg which has a rectangular section for the purpose of transmitting the torque from the peg to the rotor element 20.

The rotor element 20 comprises at the inner end a central peg 28 which is circular in cross section and which sits in a corresponding bore 30 at the facing end of the rotor element 18. In this manner a rotational bearing is created between the rotor elements 18, 20.

The rotor element 18 is formed with a recess 32 at the end facing the peg 28. On the wall of the recess 32 opposite there are formed coupling sections 34, 36 which are triangular in cross section with coupling surfaces 38 which are approximately at right angles to one another. The coupling sections 34, 36 project radially inwards in the direction of the common axis of the rotor elements 18, 20. The rotor element 20 comprises between the peg 28 and the upper section 24 a plate-like section 40 which is centrally arranged and which engages into the recess 32.

One recognizes from a common observation of FIGS. 1 and 2 that the described coupling permits a relative rotation between the rotor elements 18, 20 of about 90°. In the position shown in FIG. 2, a 45° rotation may take place before the rotor elements 18, 20 are coupled in the one or the other direction. With a free rotation of the rotor element 20, by nature a much lower braking moment is developed than with a rotation of both rotor elements 18, 20. In this manner it is possible to achieve a progressive damping. If a multitude of rotor elements are coupled in the described way and manner, a desired course of torque may be achieved in order to approximate the torque characteristic curve of a part to be damped.

Figure 3:
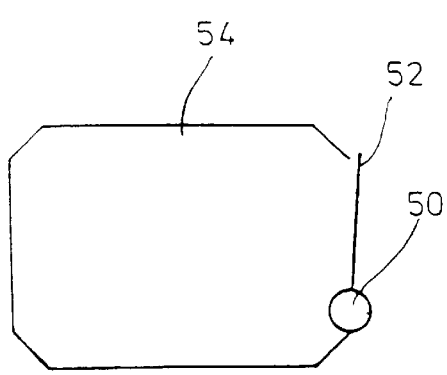
FIG. 3 is a schematic view showing the application of a rotary damper according to FIGS. 1 and 2 with a flap, wherein the flap is shown in a closed position.
Figure 4:
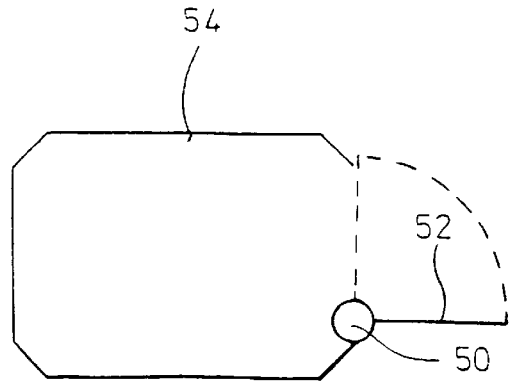
FIG. 4 is a similar view to FIG. 3 with an opened flap.

In the FIGS. 3 and 4, an example for the application of a rotary damper according to FIGS. 1 and 2 is shown schematically. In the FIGS. 3 and 4, the rotary damper is indicated at 50. It serves for damping a flap 52 which closes a glove compartment 54. One recognizes from FIG. 3 that the opening moment of the flap 52 is very low on account of the flap 52 lying approximately in the dead center. A large braking moment would consequently prevent an opening of the flap 52 by way of gravity. If a rotary damper corresponding to FIGS. 1 and 2 is applied, this with a first rotation produces a relatively low braking moment, in that only the rotor element 20 acts in a braking manner. Only when the second rotor element 18 is coupled is a much larger braking moment achieved, in order to effectively damp the flap with an adjustment into the horizontal position (FIG. 4).

Obviously, many modifications and variations of the present invention are possible in light of the above teachings. It is therefore to be understood that within the scope of the appended claims, the present invention may be practiced otherwise than as specifically described herein.

What is claimed is:

1. A rotary damper, comprising:

a housing defining a chamber having an interior peripheral wall;

a rotor rotatably disposed within said housing chamber about a rotary axis; and a viscous medium disposed within said housing chamber wherein said rotor operatively cooperates with said interior peripheral wall of said housing chamber such that a damping effect is achieved upon rotation of said rotor with respect to said housing, said rotor comprising at least two rotor elements coaxially disposed within said housing chamber and operatively coupled together such that said at least two rotor elements can freely rotate relative to each other through a limited angle of rotation about said rotary axis whereby when a first one of said at least two rotor elements is rotated relative to said housing, a first damping effect having a first damping value is achieved, whereas when a second one of said at least two rotor elements is also rotated relative to said housing along with said first one of said at least two rotor elements, a second damping effect having a second damping value is achieved.

2. The rotary damper of claim 1, wherein:

said at least two rotor elements have first adjacent ends which define a rotary bearing for permitting said at least two rotor elements to rotate with respect to each other about said rotary axis.

3. The rotary damper of claim 2, wherein said rotary bearing comprises:

an axial bore defined within a first end of a first one of said at least two rotor elements; and an axial pinion provided upon a first end of a second one of said at least two rotor elements and disposed within said axial bore of said first one of said at least two rotor elements.

4. The rotary damper as set forth in claim 1, further comprising:

means establishing engagement between said at least two rotor elements for transmitting rotary movement between said at least two rotor elements once said first one of said at least two rotor elements has been rotated through said limited angle of rotation with respect to said housing and said second one of said at least two rotor elements, such that said at least two rotor elements are rotated in unison with respect to said housing.

5. The rotary damper of 4, wherein:

said engagement means comprises a claw clutch.

6. The rotary damper of claim 5, wherein said clutch claw comprises:

a recess defined within one end of said second one of said at least two rotor elements;

a pair of diametrically opposed clutch claws disposed within said recess of said second one of said at least two rotor elements, wherein each one of said clutch claws has a clutch engagement surface; and a plate-like clutch member mounted upon said first one of said at least two rotor elements and disposed within said recess of said second one of said at least two rotor elements for selectively engaging one of said clutch engagement surfaces of said pair of clutch claws.

7. The rotary damper of claim 6, wherein:

each one of said pair of clutch claws has a geometrical configuration in cross-section with said clutch engagement surfaces of each one of said pair of clutch claws being arranged such that said plate-like clutch member can engage one of said clutch engagement surfaces of one of said pair of clutch claws depending upon the direction of rotation of said first one of said rotor elements with respect to said housing.

8. The rotary damper as set forth in claim 7, wherein:

each one of said pair of clutch claws has a substantially triangular configuration in cross-section.

9. The rotary damper as set forth in claim 8, wherein:

said clutch engagement surfaces comprises sides of a triangle disposed upon opposite sides of an apex of said triangle wherein said apex of said triangle is disposed radially inwardly toward said rotary axis of said rotor.

10. The rotary damper as set forth in claim 2, wherein:

a second end of said first one of said rotor elements is disposed externally of said housing and comprises a pinion by means of which said first one of said rotor elements is rotated about said rotary axis.

11. In combination, a rotary damper system, comprising:

a rotary part which is to have rotary movement thereof damped;

a housing defining a chamber having an interior peripheral wall;

a rotor rotatably disposed within said housing chamber about a rotary axis and operatively connected to said rotary part which is to have rotary movement thereof damped;

a viscous medium disposed within said housing chamber wherein said rotor operatively cooperates with said interior peripheral wall of said housing chamber such that a damping effect is achieved upon rotation of said rotor with respect to said housing, said rotor comprising at least two rotor elements co-axially disposed within said housing chamber and operatively coupled together such that said at least two rotor elements can freely rotate relative to each other through a limited angle of rotation about said rotary axis whereby when a first one of said at least two rotor elements is rotated relative to said housing, a first damping effect having a first damping value is achieved, whereas when a second one of said at least two rotor elements is also rotated relative to said housing along with said first one of said at least two rotor elements, a second damping effect having a second damping value is achieved.

12. The rotary damper system as set forth in claim 11, wherein:

said at least two rotor elements have first adjacent ends which define a rotary bearing for permitting said at least two rotor elements to rotate with respect to each other about said rotary axis.

13. The rotary damper system as set forth in claim 12, wherein said rotary bearing comprises:

an axial bore defined within a first end of a first one of said at least two rotor elements; and an axial pinion provided upon a first end of a second one of said at least two rotor elements and disposed within said axial bore of said first one of said at least two rotor elements.

14. The rotary damper system as set forth in claim 11, further comprising:

means establishing engagement between said at least two rotor elements for transmitting rotary movement between said at least two rotor elements once said first one of said at least two rotor elements has been rotated through said limited angle of rotation with respect to said housing and said second one of said at least two rotor elements, such that said at least two rotor elements are rotated in unison with respect to said housing.

15. The rotary damper system as set forth in claim 14, wherein:

said engagement means comprises a claw clutch.

16. The rotary damper system as set forth in claim 15, wherein said clutch claw comprises:

a recess defined within one end of said second one of said at least two rotor elements;

a pair of diametrically opposed clutch claws disposed within said recess of said second one of said at least two rotor elements, wherein each one of said clutch claws has a clutch engagement surface; and a plate-like clutch member mounted upon said first one of said at least two rotor elements and disposed within said recess of said second one of said at least two rotor elements for selectively engaging one of said clutch engagement surfaces of said pair of clutch claws.

17. The rotary damper system as set forth in claim 16, wherein:

each one of said pair of clutch claws has a geometrical configuration in cross-section with said clutch engagement surfaces of each one of said pair of clutch claws being arranged such that said plate-like clutch member can engage one of said clutch engagement surfaces of one of said pair of clutch claws depending upon the direction of rotation of said first one of said rotor elements with respect to said housing.

18. The rotary damper system as set forth in claim 17, wherein:

each one of said pair of clutch claws has a substantially triangular configuration in cross-section.

19. The rotary damper system as set forth in claim 18, wherein:

said clutch engagement surfaces comprises sides of a triangle disposed upon opposite sides of an apex of said triangle wherein said apex of said triangle is disposed radially inwardly toward said rotary axis of said rotor.

20. The rotary damper system as set forth in claim 12, wherein:

a second end of said first one of said rotor elements is disposed externally of said housing and comprises a pinion operatively engaged with said rotary part such that said first one of said rotor elements is rotated about said rotary axis and thereby initiates damping of said rotary part.

21. The rotary damper system as set forth in claim 11, wherein:

said rotary part comprises a member of a group comprising a glove compartment cover and an ash tray.

* * * * *